US005721693A

United States Patent [19]

Song

[11] Patent Number: 5,721,693

[45] Date of Patent: Feb. 24, 1998

[54] ELECTRIC HOME APPLIANCE REAL USE STATE INFORMATION COLLECTION AND ANALYSIS APPARATUS

[75] Inventor: Jun Il Song, Kyungsangnam-Do, Rep. of Korea

[73] Assignee: LG Electronics Inc., Rep. of Korea

[21] Appl. No.: 582,609

[22] Filed: Jan. 3, 1996

[30] Foreign Application Priority Data

Jan. 7, 1995 [KR] Rep. of Korea ........................ 216/1995

[51] Int. Cl.[6] ........................................ H04B 17/00

[52] U.S. Cl. ................................ 364/551.01; 340/825.06

[58] Field of Search ................. 364/551.01; 340/825.06, 340/825.16, 825.22, 825.29, 825.07; 395/200, 909; 379/102

[56] References Cited

U.S. PATENT DOCUMENTS 5,530,435 6/1996 Toms et al. ........................ 340/825.07
5,553,123 9/1996 Chau et al. ............................ 379/102
5,570,085 10/1996 Bertsch .............................. 340/825.07

*Primary Examiner*—James P. Trammell
*Assistant Examiner*—Thomas Peeso
*Attorney, Agent, or Firm*—Ostrolenk, Faber, Gerb & Soffen, LLP

[57] ABSTRACT

An improved electric home appliance real use state information collection and analysis apparatus capable of providing a product design reference data by collecting and analyzing user's real use state and home appliance surrounding environments, thus improving reliability of the product, which includes an electric home appliance microcomputer for controlling the entire functions of a certain electric home appliance and for detecting a real use state of a user's real electric home appliance; an UPA microcomputer for storing a user's use state data inputted from the electric home appliance microcomputer and the collected various surrounding environment data into a memory and for transmitting the data to another element; and a personal computer for receiving and analyzing the data transmitted from the UPA microcomputer via an RS-232 serial communication link, thus providing a product design reference data by collecting and analyzing user's real use state and home appliance surrounding environments, thus improving reliability of the product.

4 Claims, 3 Drawing Sheets

ELECTRIC HOME APPLIANCE REAL USE STATE INFORMATION COLLECTION AND ANALYSIS APPARATUS

BACKGROUND OF THE INVENTION

1. Field of the Invention

The present invention relates to an electric home appliance real use state information collection and analysis apparatus, and particularly to an electric home appliance real use state information collection and analysis apparatus capable of providing product design reference data by collecting and analyzing user's real use state and home appliance surrounding environments, thus improving reliability of the product.

2. Description of the Conventional Art

Generally, when a new electric home appliance such as a refrigerator is developed, its function and specification are determined by experimental data and experience data.

Therefore, the conventional electric home appliance has a disadvantage in that since user's real use environments for example temperature by locales, locale voltage levels, and the like are not considered in designing the products, the product characteristic corresponding to the use environment and method by regions are not satisfied.

SUMMARY OF THE INVENTION

Accordingly, it is an object of the present invention to provide an electric home appliance real user state information collection and analysis apparatus, which overcome the problems encountered in a conventional electric home appliance.

It is another object of the present invention to provide an electric home appliance real use state information collection and analysis apparatus capable of providing product design reference data by collecting and analyzing user's real use state and home appliance surrounding environments, thus improving reliability of the product.

To achieve the above objects, there is provided an electric home appliance real use state information collection and analysis apparatus, which includes a microcomputer for controlling the entire functions of a certain electric home appliance and for detecting a real use state of a user a user pattern analysis (UPA) microcomputer for storing a user's use state data inputted from the electric home appliance microcomputer and the collected various surrounding environment data into a memory and for transmitting the data to another element; and a personal computer for receiving and analyzing the data transmitted from the UPA microcomputer via a serial communication link.

DETAILED DESCRIPTION OF THE INVENTION

In this embodiment, a refrigerator as an exemplary electric home appliance is adopted in order to implement the present invention.

Figure 1:
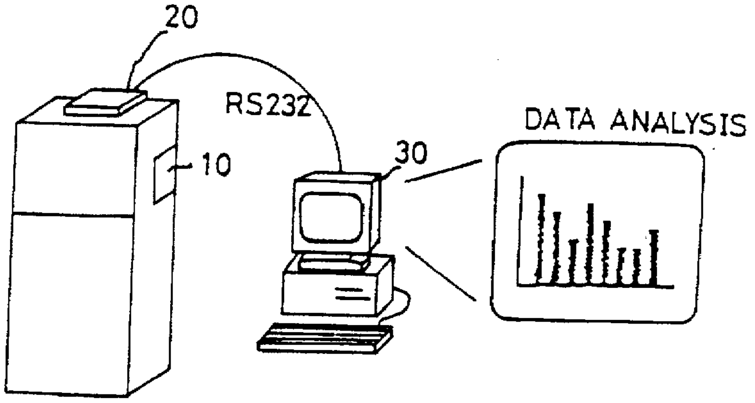
FIG. 1 is a view of a system for analyzing a real use data for a refrigerator using a computer according to the present invention.
Figure 2:
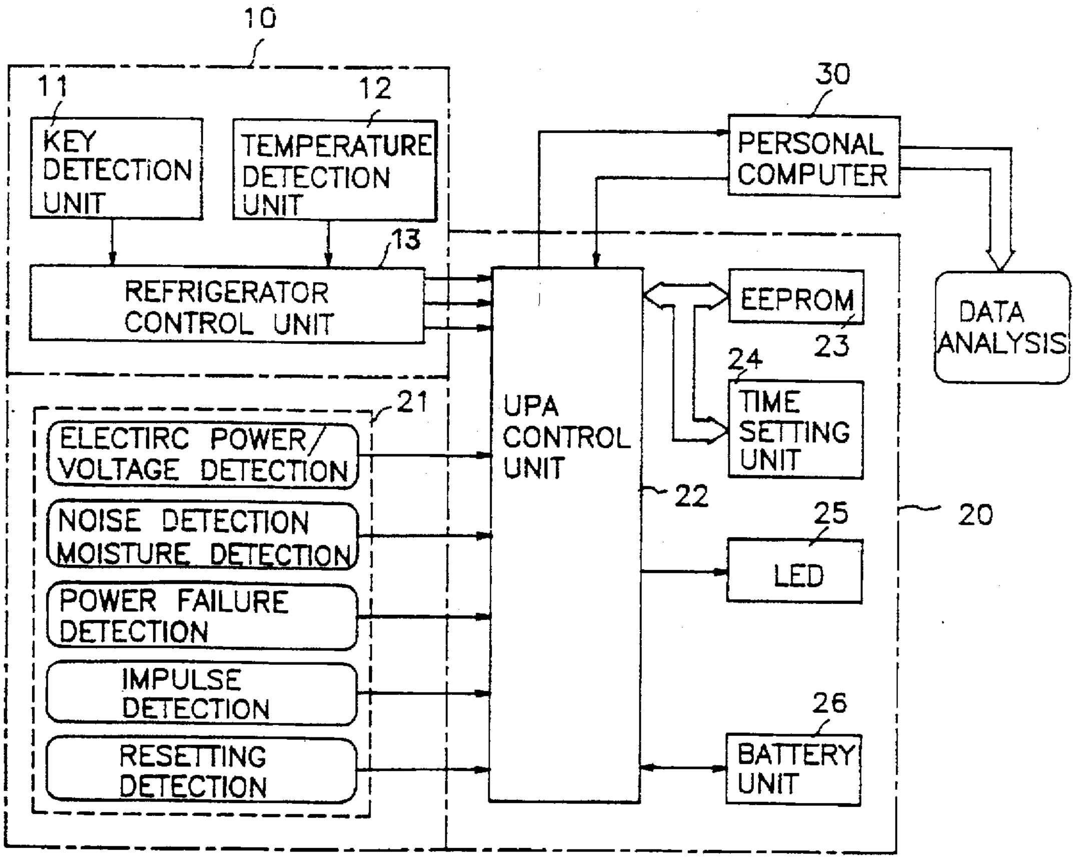
FIG. 2 is a block diagram of an electric home appliance real use state information collection and analysis apparatus according to the present invention.

FIG. 2 shows an electric home appliance real use state information collection and analysis apparatus according to the present invention adapted to a refigerator, which includes a refrigerator microcomputer 10 for controlling the entire functions of a refrigerator and for receiving use state of the refrigerator such as key operations, input temperature, and the number of door opening with the apparatus including a user pattern analysis (UPA) microcomputer 20 for collecting the use state data outputted from the refrigerator microcomputer 10 and various surrounding environment data of the refrigerator and for storing the data into a memory, and a personal computer (PC) 30 for receiving and analyzing the data outputted from the UPA microcomputer 20 via an RS-232 serial communication link.

The refrigerator microcomputer 10 includes a key detection unit 11 for detecting a key operation, a temperature detection unit 12 for detecting outside temperature, and a refrigerator control unit 13 for controlling various functions of the refrigerator and for outputting the outputs of the key detection unit 11 and the temperature detection unit 12 to the UPA microcomputer 20.

The UPA microcomputer 20 includes a detection unit 21 for detecting surrounding environment data of the refrigerator such as moisture, power failure, the number of resets, electric power/voltage, noise, impulses and the like, an UPA control unit 22 for controlling the functions by receiving the detection data outputted from the detection unit 21, an electrically erasable and programmable read only memory (EEPROM) 23 for receiving and storing the data outputted from the UPA control unit 22, a time setting unit 24 for setting time, a light emitting diode display unit 25 for indicating the operation states of the refrigerator control unit 13 of the refrigerator microcomputer 10 and the UPA control unit 22, and a back-up battery 26 for backing-up the data of the UPA control unit 22 and the time setting unit 24.

The operation of the electric home appliance real use state information collection and analysis apparatus according to the present invention will now be explained with reference to the accompanying drawings.

To begin with, the UPA microcomputer 20 collects and stores the use and environment data detected by the refrigerator microcomputer 10 and the surrounding environment data of the refrigerator, and transmits the stored data via an RS-232 serial communication link when there is any request from the PC 30.

Thereafter, the PC 30 receives and analyzes the transmitted data and judges the use state of each function of the refrigerator, the real use life span of various parts, electric power/voltage variation, climate by locales/characteristic by house, and the like.

Figure 3:
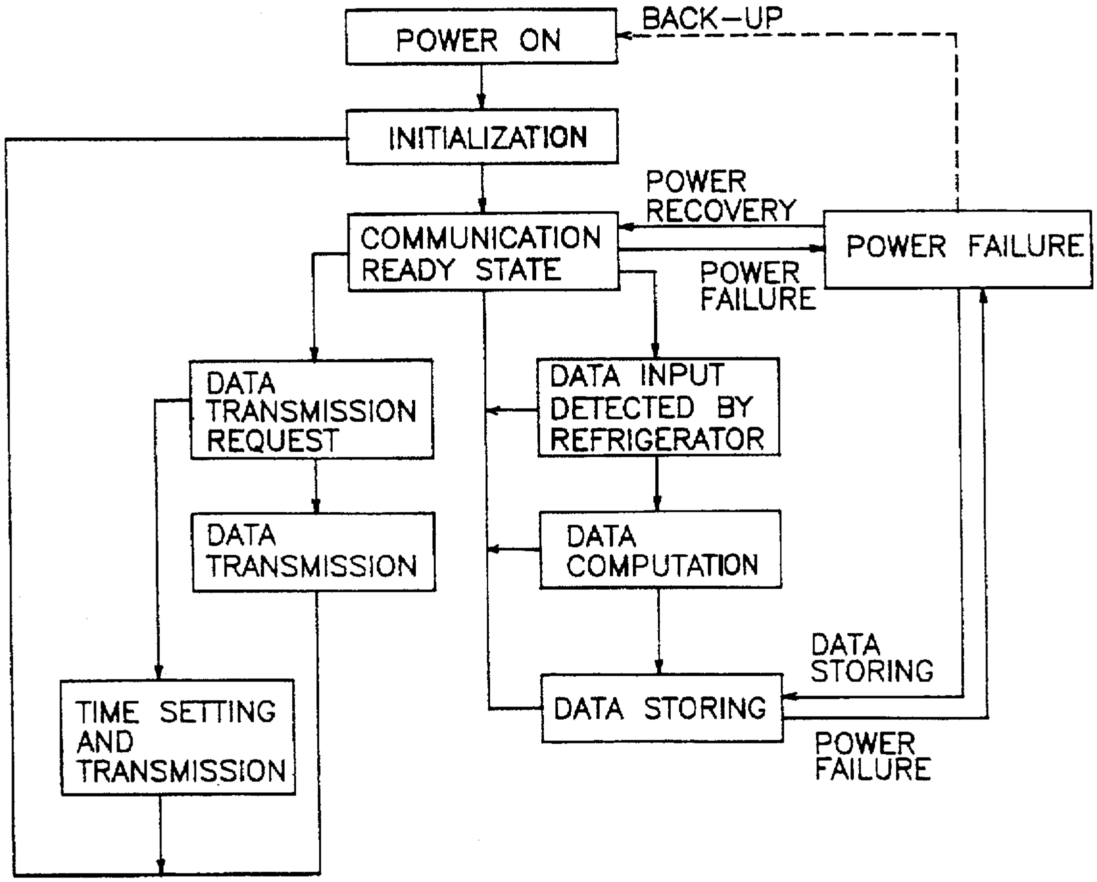
FIG. 3 is a flow chart of a real use state information collection and analysis process for a refrigerator using the apparatus of FIG. 2 according to the present invention.

That is, the UPA control unit 22, as shown in FIG. 3, initializes the system when the system is turned on and assumes a ready state to receive a signal from the refrigerator microcomputer 10 and the PC 30.

Figure 4A:
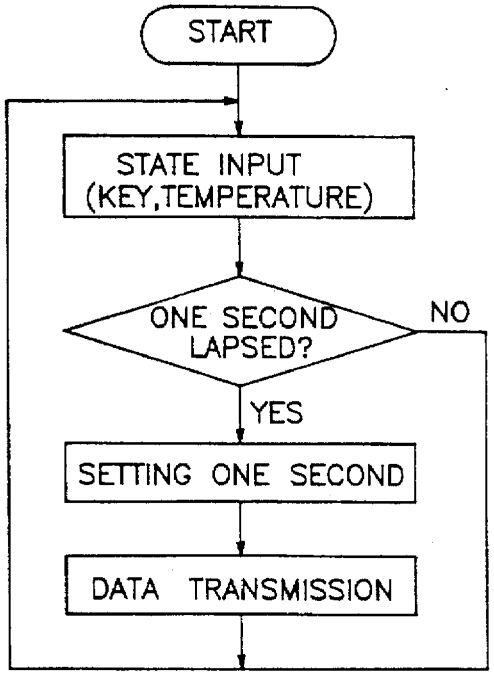
FIGS. 4A and 4B are flow charts of an operation process of a refrigerator control unit and a use pattern analysis (UPA) control unit of the apparatus of FIG. 2.

At this time, as shown in FIG. 4A, when the user inputs a desired function key and a desired temperature, the temperature detection unit 11 detects the refrigerator temperature and outputs a signal to the refrigerator control unit 13 and the key detection unit 11 detects the key input and outputs a signal to the refrigerator control unit 13. The refrigerator control unit 13 controls the refrigerator in accordance with the inputted function key and temperature and counts time every second and transmits the function key input and temperature to the UPA microcomputer 20.

Figure 4B:
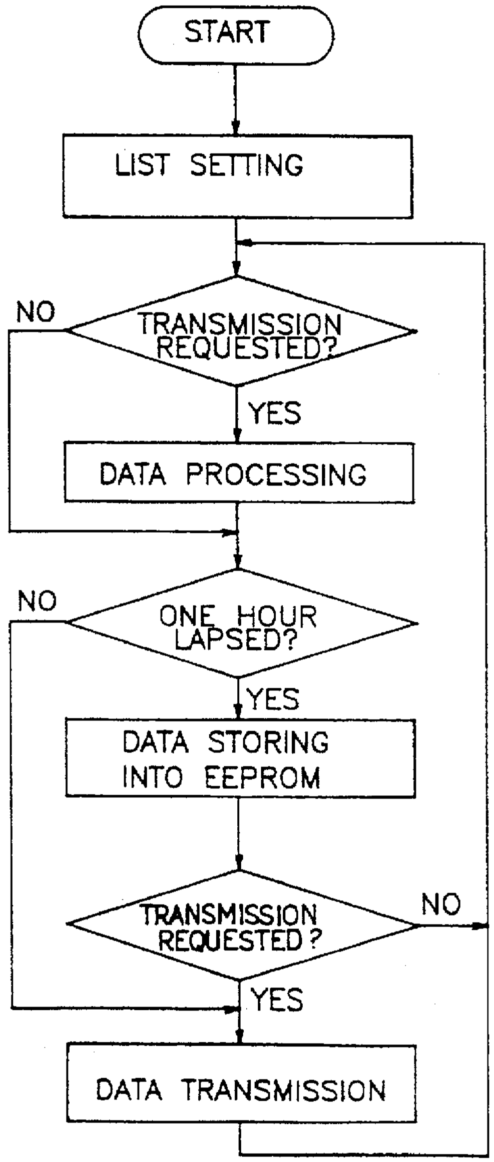

Thereafter, the UPA control unit 22, as shown in FIG. 4B, receives the use state data outputted from the control unit 13 every second such as key operation, input temperature, the number of door openings, and the like and the data of the detected surrounding environment of the refrigerator such as moisture, power failure, the number of resets, electric power/voltage, noise, impulses and the like, and sets a list corresponding to the thusly received data, and analyzes the data to be transmitted when the PC 30 requests a data transmission via the RS-232 serial communication link, and computes an average value, and outputs the current time, and stores the corresponding data every hour, and returns to a communication ready state. At this time, the time setting unit 24 sets the current time and transmits the time to the EEPROM 23 through the UPA control unit 22.

In addition, when a power failure occurs, the back-up battery 26 is operated, and the UPA microcomputer 20 recovers its operation state and detects the time of the power failure state and stores the data one time when a data storage request is received during the power failure.

Thereafter, when there is a request from the PC 30 to transmit data via the RS-232 serial communication link, the UPA control unit 22 sets the current time through the time setting unit 24 and transmits the data stored in the EEPROM 23 and the set time to the PC 30 and erases all of the data stored in the EEPROM 23.

Therefore, the PC 30 analyzes the user state data transmitted from the UPA microcomputer 20 and the surrounding environment data of the refrigerator and analyzes the use state of each function of the refrigerator, the real use life span of various parts, electric power/voltage variation, climate by locales, characteristic by home, and the like.

In addition, the electric home appliance real use state information collection and analysis apparatus according to the present invention is not limited to a refrigerator. It is also adaptable to any kind of electric home appliance.

As described above, the electric home appliance real use state information collection and analysis apparatus according to the present invention is directed to detecting and analyzing the use state such as key operations, the number of door openings, temperature setting, and the like, and moisture, power failure, the number of resetting, electric power/voltage, noise, impulse, and the like every hour, thus achieving clarification of the design reference when developing a new product with a new function, and providing real use life span of each part adapted in the refrigerator, and providing data corresponding to the characteristics by locales and home, so that it is possible to design a reliable product for customers.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An electric home appliance use state information collection and analysis apparatus, comprising:

a microcomputer disposed in an electric home appliance for controlling all the functions of the appliance and for detecting a real use state of the appliance;

a user pattern analysis (UPA) microcomputer for receiving and storing use state data of various parameters of the appliance inputted from said microcomputer in the appliance and for receiving and storing various surrounding environment data, said data being stored in a memory and being periodically transmitted outside the UPA microcomputer; and a personal computer for periodically receiving the data transmitted from said UPA microcomputer via an RS-232 serial communication link and thereafter analyzing the same to evolve improvements in appliance design and control.

2. The apparatus of claim 1, wherein the surrounding environment data includes moisture, a power failure, a number of appliance resettings, electric power/voltage levels, noise, and impulses.

3. An electric home appliance use state information collection and analysis apparatus, comprising:

a microcomputer disposed in an electric home appliance for controlling all the functions of the appliance and for detecting a real use state of the appliance;

a user pattern analysis (UPA) microcomputer for receiving and storing use state data of various parameters of the appliance inputted from said microcomputer in the appliance and for receiving and storing various surrounding environment data, said data being stored in a memory and being periodically transmitted outside the UPA microcomputer; and a personal computer for periodically receiving the data transmitted from said UPA microcomputer via an RS-232 serial communication link and thereafter analyzing the same to evolve improvements in appliance design and control;

wherein the UPA microcomputer includes:

a detection unit for detecting surrounding environment data of the electric home appliance;

a UPA control unit for receiving the detected data outputted from said detection unit and for controlling various appliance functions;

an EEPROM for receiving data from said UPA control unit and for storing the data;

a time setting unit for setting an initial time;

an LED unit for indicating an operation state of the electric home appliance control unit and the UPA control unit; and a back-up battery for providing back-up power for enabling the storing of data in the UPA control unit and the operation of the time setting unit during a power failure.

4. An electric home electric appliance use state information collection and analysis apparatus, comprising:

a microcomputer disposed in an electric home appliance for controlling the entire functions of the appliance and for detecting a real use state of the appliance;

a user pattern analysis (UPA) microcomputer for storing use state data inputted from said microcomputer in the appliance and detected surrounding environment data into a memory and for periodically transmitting the stored date; and a personal computer for receiving and analyzing the data transmitted from said UPA microcomputer via an RS-232 serial communication link;

wherein the UPA microcomputer includes:

a detection unit for detecting surrounding environment data of the electric home appliance;

a UPA control unit for receiving the detection data outputted from said detection unit and for controlling various functions;

an EEPROM for receiving data from said UPA control unit and for storing the data;

a time setting unit for setting an initial time;

an LED unit for indicating an operation state of the electric home appliance control unit and the UPA control unit; and a back-up battery for providing back-up power for the storing of data in the UPA control unit and the operation of the time setting unit during a power failure, wherein the microcomputer in the home appliance comprises:

a key detection unit for a key detection operation;

a temperature detection unit for detecting an outside temperature; and an electric home appliance control unit for controlling various functions of the electric home appliance and for outputting signals of said key detection unit and said temperature detection unit to said UPA microcomputer.

* * * * *